United States Patent [19]

Harada et al.

[11] Patent Number: 4,944,193
[45] Date of Patent: Jul. 31, 1990

[54] AUTOMATIC TRANSMISSION WITH A POWER TAKE-OFF MECHANISM

[75] Inventors: Kouhei Harada, Nagoya City; Hiromi Hasegawa, Obucity, both of Japan

[73] Assignee: Aisin Seiki Kabushiki Kaisha, Kariya, Japan

[21] Appl. No.: 316,778

[22] Filed: Feb. 28, 1989

[30] Foreign Application Priority Data

Feb. 29, 1988 [JP] Japan ............................ 63-026302[U]

[51] Int. Cl.⁵ ............................................ F16H 37/00
[52] U.S. Cl. .................................. 74/15.86; 74/15.66; 475/331
[58] Field of Search .............. 74/15.66, 15.86, 750 R, 74/753, 759

[56] References Cited

U.S. PATENT DOCUMENTS 2,923,178  2/1960  Miller ............................. 74/15.86 X
3,319,491  5/1967  Simpson ........................... 74/753 X Primary Examiner—Dirk Wright
Attorney, Agent, or Firm—Burns, Doane, Swecker & Mathis

[57] ABSTRACT

An automatic transmission provided with a power take-off mechanism friction clutches and planetary gears for multiple gear ratio changes. A front friction drum houses the friction clutches which are coaxially and radially disposed with respect to each other, and a step portion is formed on a radial outer side of the drum for operating a radial outer one of the friction clutches and setting a power take-off drive gear.

8 Claims, 2 Drawing Sheets

AUTOMATIC TRANSMISSION WITH A POWER TAKE-OFF MECHANISM

BACKGROUND OF THE INVENTION

1. Field of the Invention

The invention relates to an automatic transmission provided with a power take-off mechanism for use in a variety of vehicles including a dump truck, a concrete or similar mixer vehicle, fire trucks, etc.

2. Description of the Related Art

A conventional automatic transmission provided with a power take-off mechanism has three frictional clutches which are axially disposed on a line with each other. Another conventional automatic transmission with a power take-off mechanism which has a power take-off drive gear on the outer side of a drum which houses a portion of a frictional clutch. In this transmission the power take-off drive gear is located on the conventional cylindrically formed clutch drum.

In a transmission having plural frictional clutches positioned axially of each other, an elongated axial space is required. When the vehicle has a sufficiently large space for the transmission, no problems are presented. However, when the vehicle has a RR (rear engine, rear drive) System, the vehicle has a reduced axial space and it is difficult to position the transmission into the reduced space. When the transmission is provided with a lock-up clutch mechanism, an even longer axial space is required and it is more difficult to accommodate the transmission in the vehicle.

As a solution of the problem, it has been considered to position the clutches coaxially and radially with respect to each other and, consequently, to axially shorten the space requirement. However, when the mechanism also includes a PTO drive gear on one of the clutch drums in the arrangement of the coaxially and radially positioned clutches, as discussed, the transmission casing is radially expanded or increased as result of the radially positioned clutches and the PTO drive gear.

SUMMARY OF THE INVENTION

It is an object of the invention to provide an automatic transmission with a power take-off mechanism having compact transmission casing.

It is another object of the invention to provide an automatic transmission with a power take-off mechanism having a coaxially and radially positioned clutches.

It is another object of the invention to provide an automatic transmission with a power take-off mechanism having a power take-off drive gear radially outwardly of one of the clutch mechanisms.

It is another object of the invention to provide a more compact and lighter automatic transmission with a power takeoff mechanism.

In order to accomplish these objects, an automatic transmission with a power take-off mechanism includes a front drum which is connected with an input shaft and in which the frictional clutches are coaxially and radially positioned relative to each other. A stepped section is formed on a radial outer side of a drum housing for a piston which operates a radially outer one of the friction clutches and on which a power take-off drive gear is provided.

DETAILED DESCRIPTION OF PREFERRED EMBODIMENTS IN THE INVENTION

Figure 1:
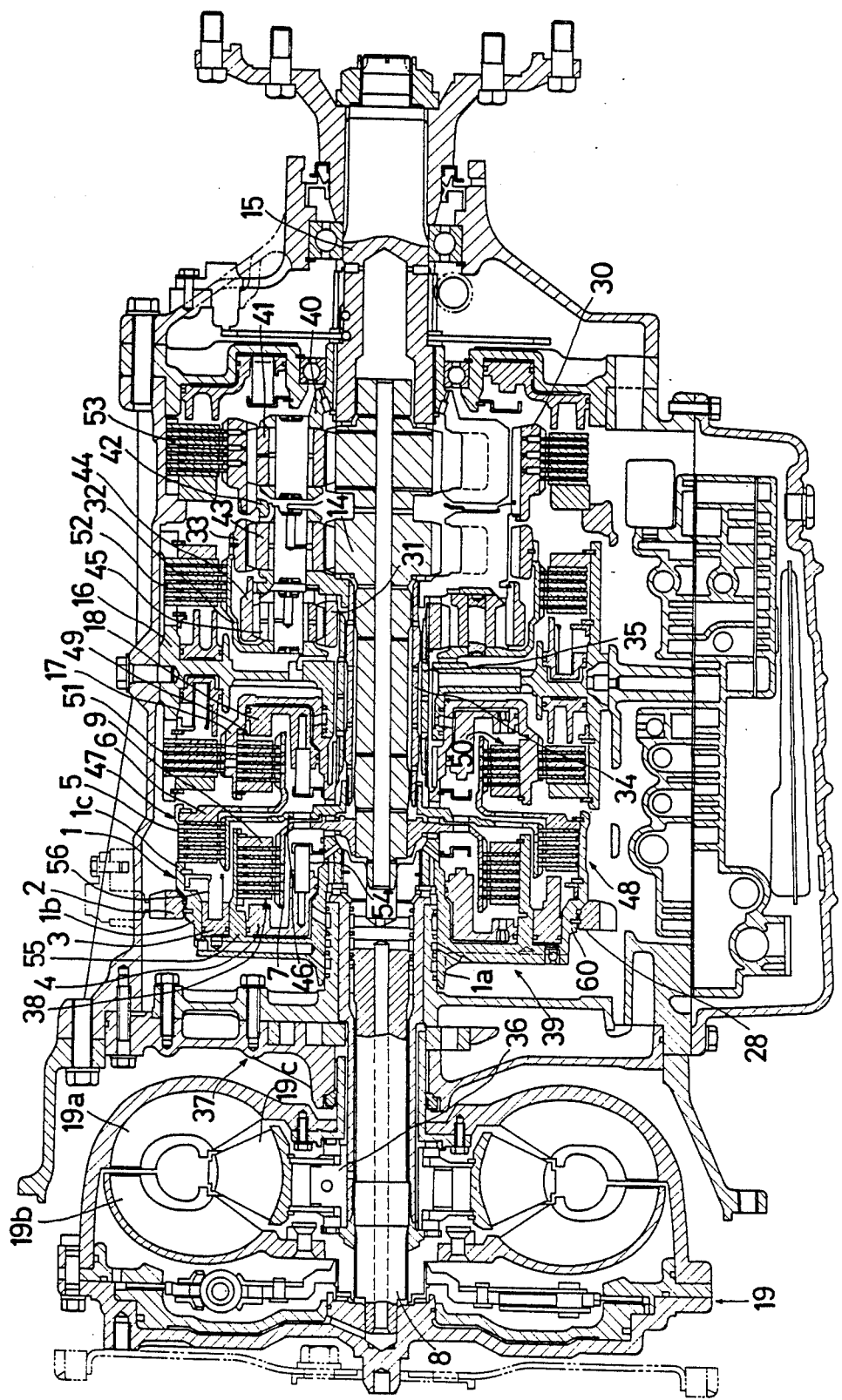
FIG. 1 shows a cross-sectional view of a transmission of the invention.
Figure 2:
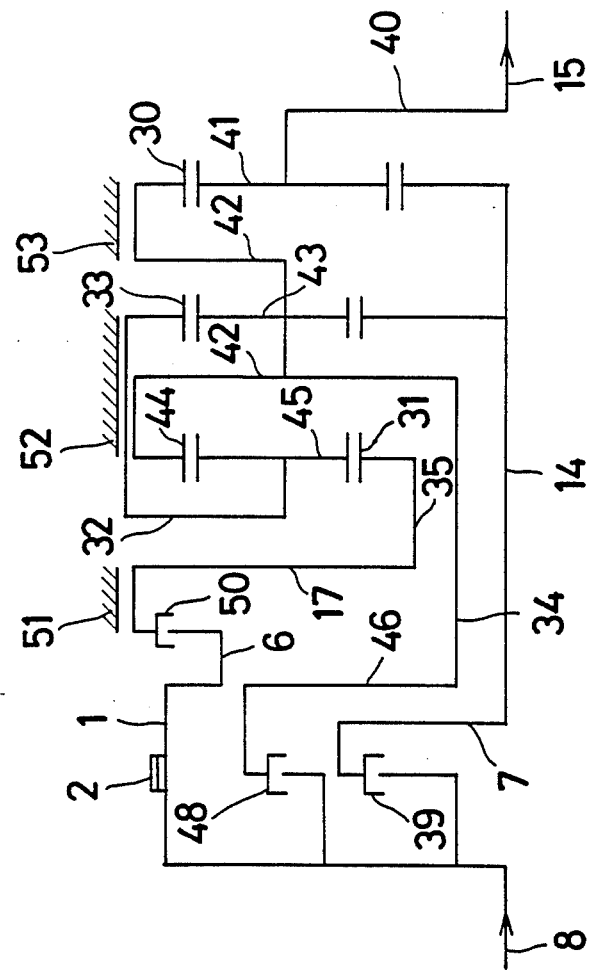
FIG. 2 is a schematic representation of FIG. 1.

In FIGS. 1 and 2, a torque convertor 19 of a conventional type is provided, and comprises a pump runner 19a connected to an output shaft of an engine (not shown), a turbine runner 19b connected to a transmission input shaft 8 and facing the pump runner 19a. A stator 19c is connected to a casing 37 through a one way clutch 36. The transmission input shaft 8 is connected to a front drum 1. Three clutches, identified in their entirety as C1, C2 and C3, are provided in the transmission. Inside of the front drum 1, clutch C1 is shown at 39 and is positioned radially inwardly with respect to clutch C3. Clutch C3 is shown at 48 and is positioned radially outwardly of the C1 clutch 39. Between C3 clutch hub 55 and C1 clutch hub 7, a plurality of frictional clutch elements 38 are interleaved and are engageable with one another by actuation of C1 clutch piston 4. C1 clutch hub 7 is connected to an intermediate transmission shaft 14 which engages a planetary pinion 43 of a second stage planetary gear set and a planetary pinion 41 of a third stage planetary gear set. Between the front drum 1 and a flange part 46, frictional clutch elements 47 are interleaved, and comprise C3 clutch 48 engageable by actuation of C3 clutch piston 3. The flange part 46 is connected to carrier 42 of the second stage planetary gear set through a concentric shaft 34. Between C3 clutch flange 6 and C2 clutch drum 17, frictional clutch elements 49 are interleaved and comprise C2 clutch 50 engageable by actuation of C2 clutch piston 18.

C2 clutch drum 17 is connected to a sun gear 31 through a shaft 35 concentric with shafts 14 and 34. A planetary pinion 45 of the first stage planetary gear set is rotatably supported on the carrier 32 and engages the sun gear 31 and a ring gear 44. The carrier 32 is connected to a ring gear 33 of the second stage planetary gear set and the ring gear 44 is connected to the carrier 42 of the second stage planetary gear set. The ring gear 33 engages with a planetary pinion 43 rotatably supported on carrier 42 and connected to the ring gear 30 of the third stage planetary gear set. The ring gear 30 engages with a planetary pinion 41 rotatably supported on the carrier 40 which is connected to the output shaft 15.

The C2 clutch drum 17, the ring gear 33 of the second stage planetary gear set and the ring gear 30 of the third stage planetary gear set, are arranged to be engageable and disengageable with B1 brake 51, B2 brake 52 and B3 brake 53, respectively.

Table 1 shows the operating conditions of the clutches and brakes for each of the gear ratio changes of the transmission. In Table 1, "0" means that the clutch or the brake is in an engaged condition.

TABLE 1

| Changes | Clutches | | | Brakes | | |
| --- | --- | --- | --- | --- | --- | --- |
|  | C1 | C2 | C3 | B1 | B2 | B3 |
| 1st | 0 |  |  |  |  | 0 |
| 2nd | 0 |  |  |  | 0 |  |
| 3rd | 0 |  |  | 0 |  |  |
| 4th | 0 |  | 0 |  |  |  |

TABLE 1-continued

| Changes | Clutches | | | Brakes | | |
|---|---|---|---|---|---|---|
| | C1 | C2 | C3 | B1 | B2 | B3 |
| 5th | | | 0 | 0 | | |
| 6th | | | 0 | | 0 | |
| Rev. | | 0 | | | | 0 |
| N | | | | | | 0 |

In the first position, clutch C1 and brake B3 are each engaged. The torque of the input shaft 8 is transmitted to the intermediate shaft 14 from the C1 clutch hub 7 by the engagement of C1 clutch 39 and is transmitted to the output shaft 15 through the third stage planetary gear set which has the ring gear 30 braked by the engagement of B3 brake 53.

In the second position, the carrier 32 of the first stage planetary gear set and the ring gear 33 of the second stage planetary gear set are prevented from rotation by engagement of B2 brake 52. The clutch C1 remains engaged.

In the third position, the sun gear 31 of the first stage planetary gear set is braked by engagement of B1 brake 51 positioned in the center support 16 so as to effect a gear ratio change.

In the fourth position, the engine output torque is directly transmitted to the output shaft 15 by the engagement of clutches C1 and C2.

In the fifth position, torque is transmitted to the planetary gear 42 of the second stage planetary gear set through the flange portion 46 and concentric shaft 34 by engagement of C3 clutch 48. The brake B1 is engaged to prevent rotation of sun gear 31 of the first planetary gear set.

In the sixth position, the torque is similarly transmitted by engagement of clutch C3 to transmit torque along concentric shaft 34 to the carrier 42 of the secondary planetary gear set, the ring gear 30 and carrier 40 of the third planetary gear set to the output shaft 15. Brake B2 is engaged to prevent rotation of ring gear 33 of the secondary planetary gear set and carrier 32 of the first planetary gear set.

In the Rev position, clutch piston 18 of clutch drum 17 moves to the left from the position shown in FIG. 1 by hydraulic pressure and C2 clutch 50 is engaged. Thereby the torque is transmitted from the front drum 1 through C2 clutch flange 6 and C2 drum 17 to sun gear 31 of the first planetary gear set. Brake B3 is engaged so as to prevent rotation of carrier 42 and ring gear 30 of the second and third planetary gear sets, respectively.

The clutch mechanism is constructed with two clutches, i.e, clutches C1 and C2 being positioned in the front drum 1. Radially inwardly positioned in the front drum 1, C1 clutch 39 comprises C1 piston 4 and frictional engaging elements 38. Positioned radially outwardly thereof in the front drum 1, C3 clutch 48 comprises C3 piston 3 and frictional engaging elements 47. The front drum 1 has a step portion 1b on an end section of a radially outer side part 1c. The step 1b is radially recessed in comparison with the outer part 1c. C1 clutch piston 4 is slidably received in the hub 1a of the drum 1 along a central portion thereof. The piston 4 is forced to the left as shown in FIG. 1 by the spring 54. Between C1 clutch hub 7 and C3 clutch hub 55 frictional engaging elements 38 are positioned. The piston 4 moves to the right, from the position shown in FIG. 1, due to hydraulic pressure against the biasing force of the spring 54 and compresses the frictional engaging elements 38 so as to engage C1 clutch 39 and connect the front drum 1 and C1 clutch hub 7. C3 clutch piston 3 is positioned radially inwardly of the step 1b and slidably supported by C3 clutch hub 55. The radially outer extent of the diameter of the piston 3 is less than the radially outer extent of friction engaging element 47, and the radially inner extent of the diameter of the piston 3 is substantially the same as the radially inner extent of the friction element 47. This arrangement permits the drum to be reduced in diameter so as to accommodate the PTO gear 2 on the reduced section or step portion 1b of the drum 1. The piston 3 is biased to the left, as shown in FIG. 1, by the spring 56. Between the outer side part 1c of the drum 1 and the flange part 46, the frictional engaging element 47 is disposed. The piston 3 moves to the right against the pressing force of the spring 56 under the force produced by the hydraulic pressure, compresses the frictional engaging elements 47 so as to engage the C3 clutch 48 and connect the front drum 1 and the flange part 46. On the step 1b, the PTO (power take-off) drive gear 2 is connected thereto with a spline 28 and a snap ring 60. The torque of the input shaft 8 is transmitted to the drum 1 and further to an auxiliary driven mechanism through the PTO drive gear 2.

The foregoing construction provides an automatic transmission with a power take-off mechanism in a compact transmission casing.

The oil chamber for operating the C3 clutch piston is small as the diameter of the C3 piston is small, consequently the response of the clutch is advanced.

The arrangement permits easy control of the operating area of the outer piston so that the outer piston is operated by the same pressure which operates the inner piston.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An automatic transmission provided with a power take-off mechanism comprising:
   a plurality of friction clutches and a plurality of planetary gears providing for multiple gear ratio changes of the transmission;
   a front clutch drum connected with a transmission input shaft, said friction clutches being positioned coaxially and radially with respect to each other and being positioned radially interiorly of said drum; a step portion formed on a radial outer side of said drum and said drum receiving radially interiorly therein a piston for operating one of said friction clutches positioned radially outwardly with respect to another of said plurality of friction clutches; and
   a power take-off gear fixedly connected to said step portion.

2. An automatic transmission according to claim 1 wherein, said piston having a diameter in which a radial extend thereof is less than a radial extent of said one of said friction clutches.

3. An automatic transmission according to claim 1 wherein, said power take-off drive gear fixed to said step portion by a splined engagement with said drum and a snap ring to maintain said splined engagement.

4. An automatic transmission including a power take-off gear arrangement comprising:

a transmission input shaft;

a clutch drum connected to said input shaft;

a plurality of friction clutches positioned coaxially and radially, with respect to each other, radially interiorly of said drum;

a plurality of planetary gear sets, each of said gear sets including a plurality of planetary gears;

a plurality of friction brakes, each of which is adapted to brake at least one of said planetary gears of each of said planetary gear sets;

an additional friction clutch positioned downstream of said plurality of friction clutches, upstream of said plurality of planetary gear sets and substantially radially aligned with one of said plurality of friction brakes;

a step portion defined on said clutch drum along a radially exterior portion thereof; and a power take-off gear fixedly connected to said step portion of said clutch drum so as to provide an auxiliary drive.

5. The transmission of claim 4, wherein the connection between said input shaft and said clutch drum is a fixed connection to continually transfer input shaft torque to said power take-off gear.

6. The transmission of claim 4, wherein said power take-off gear is connected to said clutch drum by a spline engagement and fixed thereto by a snap ring.

7. The transmission of claim 4, further comprising a clutch flange connected between one of said plurality of clutches and said additional clutch.

8. The transmission of claim 7, wherein said flange is connected to said drum through said one of said plurality of clutches.

* * * * *